United States Patent [19]

Terahara

[11] Patent Number: 6,061,157
[45] Date of Patent: May 9, 2000

[54] OPTICAL WAVELENGTH MULTIPLEXING AND DEMULTIPLEXING DEVICE AND AN OPTICAL TRANSMISSION SYSTEM USING THE SAME

[75] Inventor: Takafumi Terahara, Kawasaki, Japan

[73] Assignee: Fujitsu Limited, Kawasaki, Japan

[21] Appl. No.: 08/876,590

[22] Filed: Jun. 16, 1997

[30] Foreign Application Priority Data

Dec. 9, 1996 [JP] Japan .................................. 8-328279

[51] Int. Cl.⁷ .................................................. H04J 14/02
[52] U.S. Cl. .................. 359/124; 359/127; 359/128; 359/130; 359/119; 385/15; 385/16
[58] Field of Search ................... 359/124, 127, 359/128, 129, 130, 110, 161, 119; 385/15, 16, 17

[56] References Cited

U.S. PATENT DOCUMENTS

| | | | |
|---|---|---|---|
| 5,414,548 | 5/1995 | Tachikawa et al. | 359/130 |
| 5,625,478 | 4/1997 | Doerr et al. | 359/119 |
| 5,745,612 | 4/1998 | Wang et al. | 359/130 |
| 5,748,811 | 5/1998 | Amersfoort et al. | 385/15 |
| 5,760,934 | 6/1998 | Sutter et al. | 359/119 |
| 5,771,112 | 6/1998 | Hamel et al. | 359/130 |
| 5,812,709 | 9/1998 | Arai et al. | 385/16 |
| 5,815,489 | 9/1998 | Takatori et al. | 359/117 |
| 5,867,289 | 2/1999 | Gerstel et al. | 359/127 |
| 5,903,371 | 5/1999 | Arecco et al. | 359/128 |

OTHER PUBLICATIONS

"High Speed and Low Cross Talk Switching Characteristic of 2×2 Gate Type Optical Switch", Kato, et al., Technical Report of IEICE, 1996.

"2×2 Magneto–optical Switch", Imura et al., Technical Report of IEICE, 1996.

"DC–Drift Free Ti: LiNbO₃ Photonics Switch with Low Radiation Loss", Satoh et al., Technical Report of IEICE, 1996.

"An Experiment on Optical Add–Drop Multiplexer Using Fiber Grating and It's Limiting Factor", Miyakawa, et al., Technical Report of IEICE, 1996.

"Transmission Characteristics of Arrayed Waveguide N×N Wavelength Multiplexer", Takahashi et al., Technical Report of IEICE, Mar. 1996.

Primary Examiner—Jeffery A. Hofsass
Assistant Examiner—John Tweel, Jr.
Attorney, Agent, or Firm—Staas & Halsey, LLP

[57] ABSTRACT

An optical wavelength multiplexing and demultiplexing device may transmit an optical signal equivalent to a lost optical signal on a normal section in WDM network. The optical wavelength multiplexing and demultiplexing device includes an optical add-drop multiplexing circuit having a plurality of pairs of input and output ports and a plurality of path switches, each connected to a corresponding pair of the plurality of pairs of input and output ports for breaking off an optical signal inputted to an input port of the corresponding pair, and switching a path of an optical signal output from an output port of the corresponding pair to the input port of the corresponding pair.

23 Claims, 13 Drawing Sheets

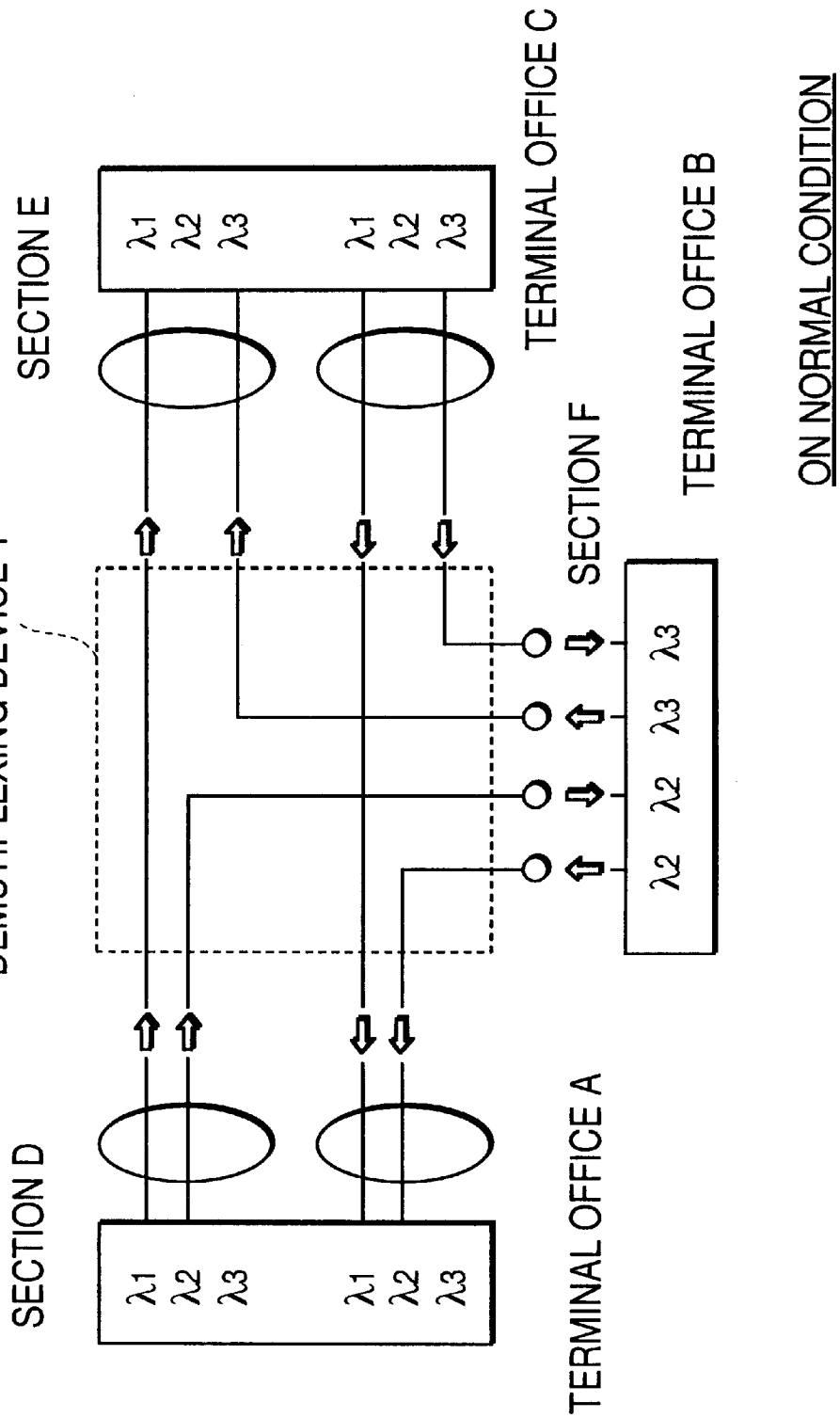

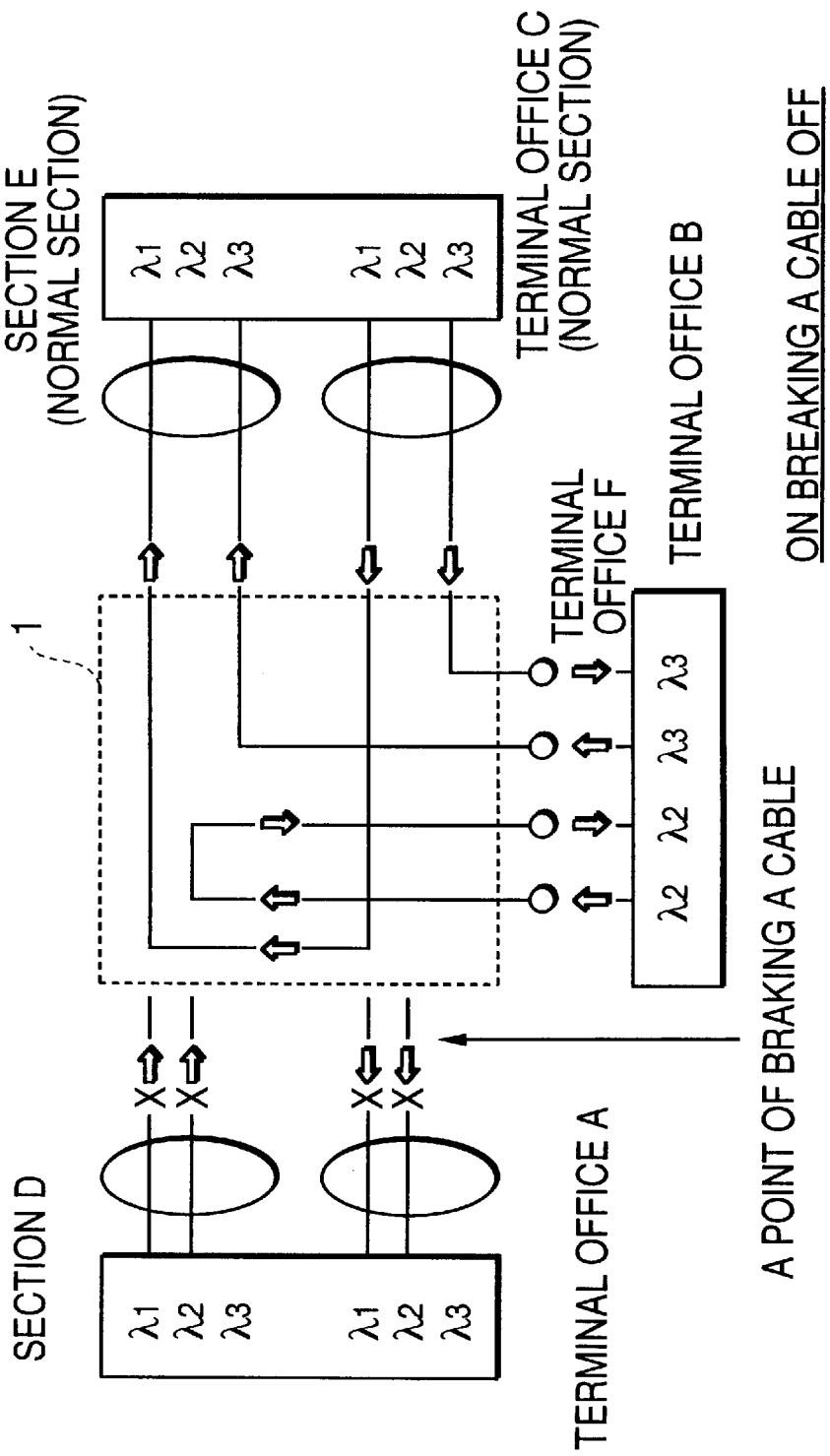

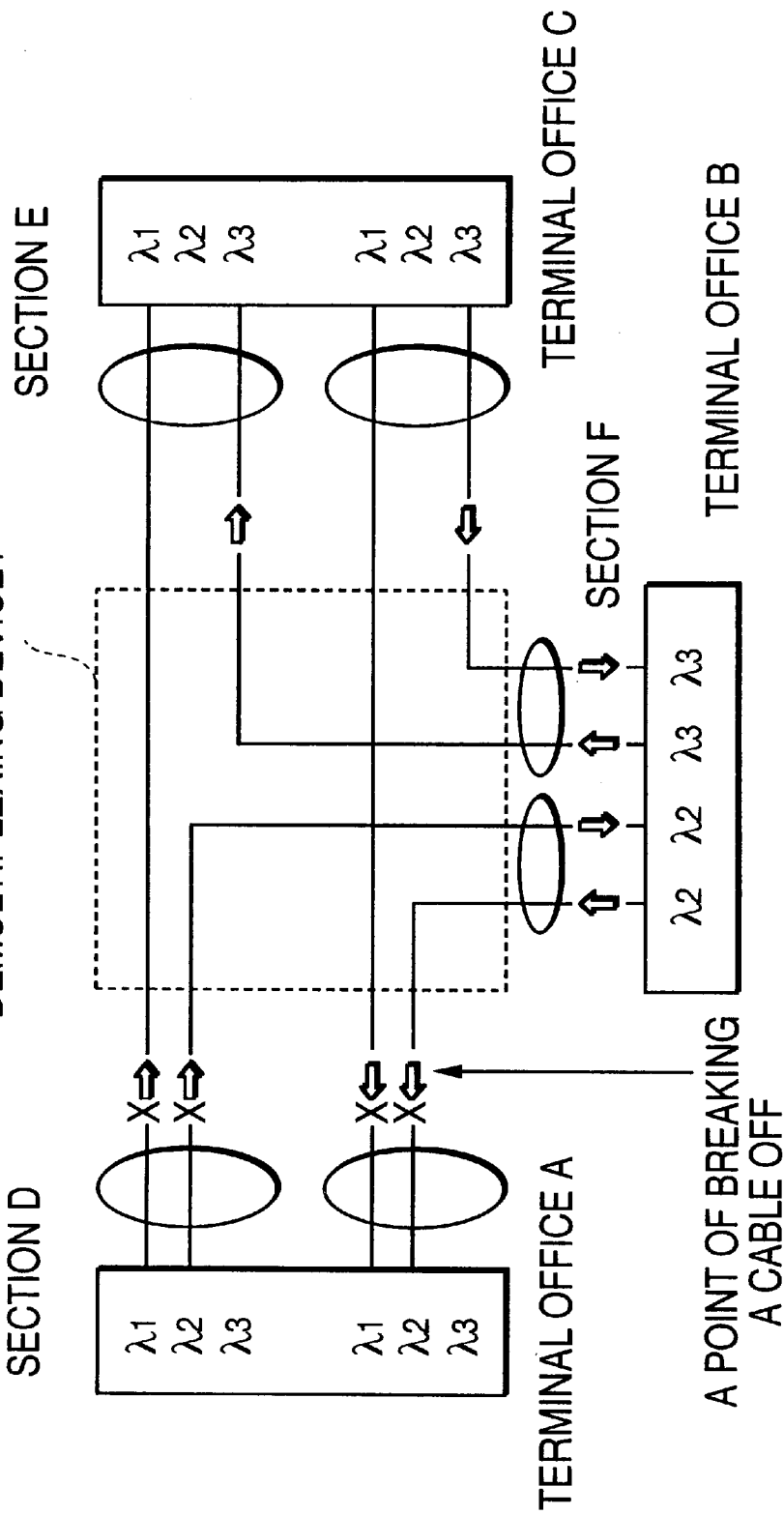

OPTICAL WAVELENGTH MULTIPLEXING AND DEMULTIPLEXING DEVICE AND AN OPTICAL TRANSMISSION SYSTEM USING THE SAME

BACKGROUND OF THE INVENTION

1. Field of the Invention

The present invention relates to an optical wavelength multiplexing and demultiplexing device used in a wavelength division multiplexing (WDM) optical communication network.

2. Description of the Related Art

An optical communication network employing a wavelength division multiplexing (WDM) technology has been extensively researched and developed in recent years.

FIG. 8 shows a schematic diagram of an example of an optical communication system, i.e., WDM network system, in which a plurality of optical wavelength multiplexing and demultiplexing devices are connected in series. One or more pairs of optical fibers OPF are provided for upward and downward communication lines as transmission paths.

The network system includes a plurality of optical amplifying repeaters REP in order to compensate losses in the optical fibers OPF. An optical amplifying repeater has two or more optical amplifiers OAMP for downward and upward lines.

Terminal offices A to D transmit a plurality of wavelength division multiplexed optical signals, i.e., WDM signals, each of which has a different wavelength, to one of the optical fibers. The optical wavelength multiplexing and demultiplexing device 1 distributes the WDM signals to transmission paths per a wavelength to transmit them to reception terminal offices A to D, which select wavelengths of the WDM signals and receive signals corresponding to the selected wavelengths.

The optical wavelength multiplexing and demultiplexing device 1 employed in the WDM network as shown in FIG. 8 is formed by combining optical add-drop multiplexers (OADM) 2 having a basic structure shown in FIG. 9.

The optical add-drop multiplexer 2 demultiplexes optical signals having some wavelengths ($\lambda d1, \lambda d2 \ldots \lambda n$) selected from the WDM signals, in which a plurality of wavelengths $\lambda d1, \lambda d2 \ldots \lambda n$ propagating in the transmission fiber of a main group are multiplexed, to branch to a transmission fiber of a branch group, which is, for example, transmission fiber 10, directed to the terminal office B. Then, the multiplexer 2 multiplexes the remaining optical signals with optical signals inputted from the transmission fiber of an insertion group, for example, a transmission fiber 11 transmitted from the terminal office B to the optical wavelength multiplexing and demultiplexing device 1, in order to output to the transmission fiber of the main group.

It is normal to select the same wavelength of the optical signal to be demultiplexed as that of the optical signal to be inserted. The optical add-drop multiplexer 2 having the above-described characteristic can be produced by employing a wavelength multiplexing and demultiplexing element, such as a dielectric multilayer filter, a WDM coupler, a fiber grating, an AWG or the like. Accordingly, wavelength multiplexing and demultiplexing elements having various structures have already been proposed, in the first literature, titled as "An Experiment on Optical Add-Drop Multiplexer Using Fiber Grating and It's Limiting Factor" described in pp. 747 of a preliminary documentation of The institute of electronics, information and communication engineers, 1996, and second literature, titled as "Transmission Characteristics of Arrayed Waveguide NXN Wavelength Multiplexer described" in Journal of Light-wave technology Vol. 13 No. 3 March, 1995

As described above, it is required to use at least one pair of optical fibers for upward and downward lines in an actual WDM optical communication system. Accordingly, the optical wavelength multiplexing and demultiplexing device 1 is formed with the use of, at least, two or more optical add-drop multiplexers 2 shown in FIG. 9.

FIG. 10 shows a supposed structural example of the optical wavelength multiplexing and demultiplexing device 1 employing the optical add-drop multiplexers 2. As shown in FIG. 10, the optical wavelength multiplexing and demultiplexing device 1 includes a pair of the optical add-drop multiplexers 2 for upward and downward directions. Then, each of the pair of the optical add-drop multiplexers 2 is connected to an optical fiber 11 for demultiplexing and optical fiber 10 for insertion and multiplexing.

In the WDM optical communication network employing the optical wavelength multiplexing and demultiplexing device 1 shown in FIG. 10, a level schedule of optical signals in a normal section is changed because of some losses of optical signals, which have passed through the normal section on breaking the transmission fiber in a certain section off.

FIG. 11 is a schematic diagram of an example of a simple WDM network to overcome the shortage of the supposed system. In the network of FIG. 11, sections D, E, and F exist between terminal offices A, B, and C and the optical wavelength multiplxing and demultiplexing device 1, respectively. Optical repeaters REP required for keeping a predetermined signal level are provided in each of sections D, E and F.

Further, it is assumed that the optical wavelength multiplexing and demultiplexing device 1 employs a structure as shown in FIG. 10. It is also assumed that each wavelength of signals shown in a following chart 1 is allocated to communicate with each terminal office.

(Chart 1)

| |
|---|
| TERMINAL OFFICE A => B $\lambda$ 2 |
| TERMINAL OFFICE B => A $\lambda$ 2 |
| TERMINAL OFFICE B => C $\lambda$ 3 |
| TERMINAL OFFICE C => B $\lambda$ 3 |
| TERMINAL OFFICE C => A $\lambda$ 1 |
| TERMINAL OFFICE A => C $\lambda$ 1 |

Accordingly, an optical signal having a wavelength shown in FIG. 12 is propagated on each transmission path. Further, in FIG. 12, a circle marked shows a signal optical fiber.

Here, a case where an optical fiber cable of the section D is broken off in the above-described system will be considered. In this case, communication paths between terminal offices A and B or terminal offices A and C are broken off. However, a communication path between terminal offices B and C is kept, because the sections E and F are normal.

Accordingly, even if the optical fiber cable is broken off in the section D, it is preferred to give no effect on communication between the terminal offices B and C in order to operate a network system. However, for example, two wavelengths of $\lambda 1$ and $\lambda 3$ are propagated into the transmission path of the section E on normal condition. On the contrary, if the cable is broken off in the section D, only one wavelength of $\lambda 3$ is propagated to the transmission path of the section E.

In this way, if a transmission path in a certain section is broken off, a number of signals, which pass a transmission path in other normal section, is decreased.

On the other hand, an output control system has been used in the conventional optical amplifying repeaters, especially for a submarine optical communication system in order to make average optical power constant. Therefore, if a number of signals, which pass through the transmission path in a normal section, is decreased because of breaking the cable in a certain section off, a signal level schedule for one wavelength in the normal section is also changed at the end. Influence of non-linear effect of an optical fiber becomes strong according to the change of the signal level schedule, there has been a case where quality of transmission was deteriorated.

To overcome the above-described problem, it has been proposed to provide a function of controlling a gain of an optical amplifying repeater to be kept constant, so that there is no change of the signal level schedule, even if the number of wavelengths is changed.

However, there has been a problem that a structure of optical amplifying repeater becomes complex in order to obtain the function of controlling the gain of the optical amplifying repeater to be kept.

It is a key point that a signal level schedule in a normal section has been changed because some of optical signals passing in a normal section are fallen down by breaking the cable off in the certain section.

SUMMARY OF THE INVENTION

Accordingly, it is an object of the present invention to provide an optical wavelength multiplexing and demultiplexing device, whereby an optical signal equivalent to the lost optical signal can be transmitted to overcome the shortage as discussed above in a WDM network.

It is another object of the present invention to provide an optical wavelength multiplexing and demultiplexing device including a path switching function in order to transmit optical signals equivalent to the lost optical signal in the WDM network.

Further, other objects of the present invention become clear by the description for explaining embodiments according to the attached drawings.

BRIEF DESCRIPTION OF THE DRAWINGS

FIGS. 1A to 1B show a block diagram showing an applied example of an optical wavelength multiplexing and demultiplexing device and a WDM network using the device according to the present invention.

FIG. 12 is an explanatory diagram of a wavelength of an optical signal propagated to each transmission path.

DESCRIPTION OF THE PREFERRED EMBODIMENTS

Figure 2:
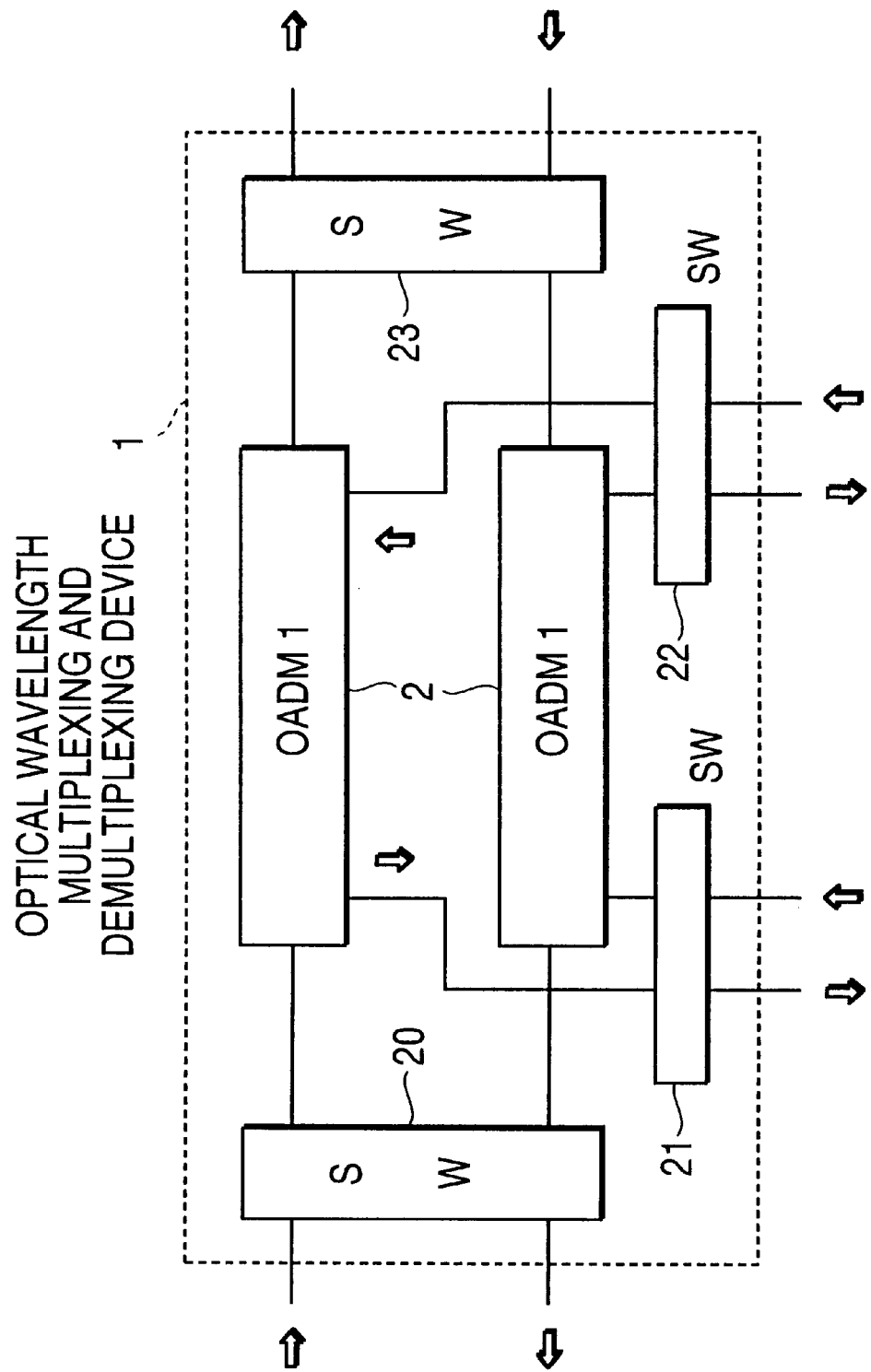
FIG. 2 is a structural diagram of the optical wavelength multiplexing and demultiplexing device 1 of the present invention to improve the function shown in FIG. 1.

Throughout the following descriptions, the same reference numerals are used to denote and identify corresponding or identical components.

FIGS. 1A and 1B are block diagrams showing a structure of an optical wavelength multiplexing and demultiplexing device according to the present invention and a WDM network using the device. FIG. 1A shows a normal situation. Shown is a case where each wavelength of signals as shown in FIG. 12 is distributed to transmit an optical signal between the terminal offices A, B and C.

FIG. 1B shows a case where a cable is broken off in the section D. In this case, an optical wavelength multiplexing and demultiplexing device 1 according to the present invention breaks input and output paths in the section D, in which the optical cable is broken off. Further, the optical wavelength multiplexing and demultiplexing device 1 has a function for directly connecting input and output ports on the broken section side.

On a normal condition, optical signals having wavelengths of λ1 and λ2 are inserted to an input port of the section D. Then, optical signals having wavelengths of λ1 and λ2 are outputted from an output port. In this way, it is designed that WDM signals having the same signal wavelengths and the same number of wavelengths are passed through a pair of upward and downward lines of the optical fibers. Therefore, according to the present invention, the optical wavelength multiplexing and demultiplexing device 1 directly connects in correspondence to input and output ports having the same wavelength on breaking a cable off.

As shown in FIG. 1B, the WDM signals equivalent to that on normal condition are propagated to the normal section E. Therefore, the signal level schedule is not changed.

Figure 10:
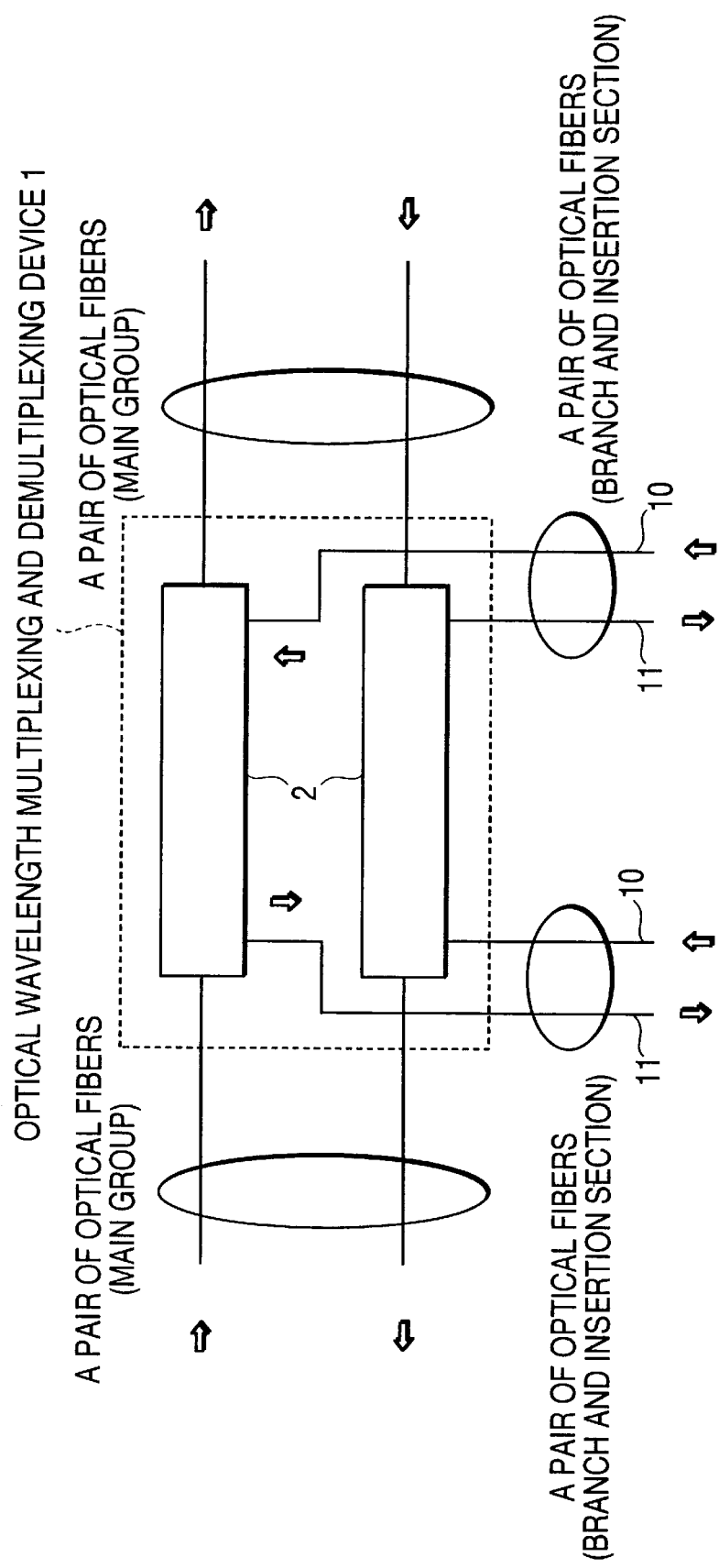
FIG. 10 shows a structural diagram of the supposed system of the optical wavelength multiplexing and demultiplexing device employing optical add-drop multiplexer 2.
Figure 11:
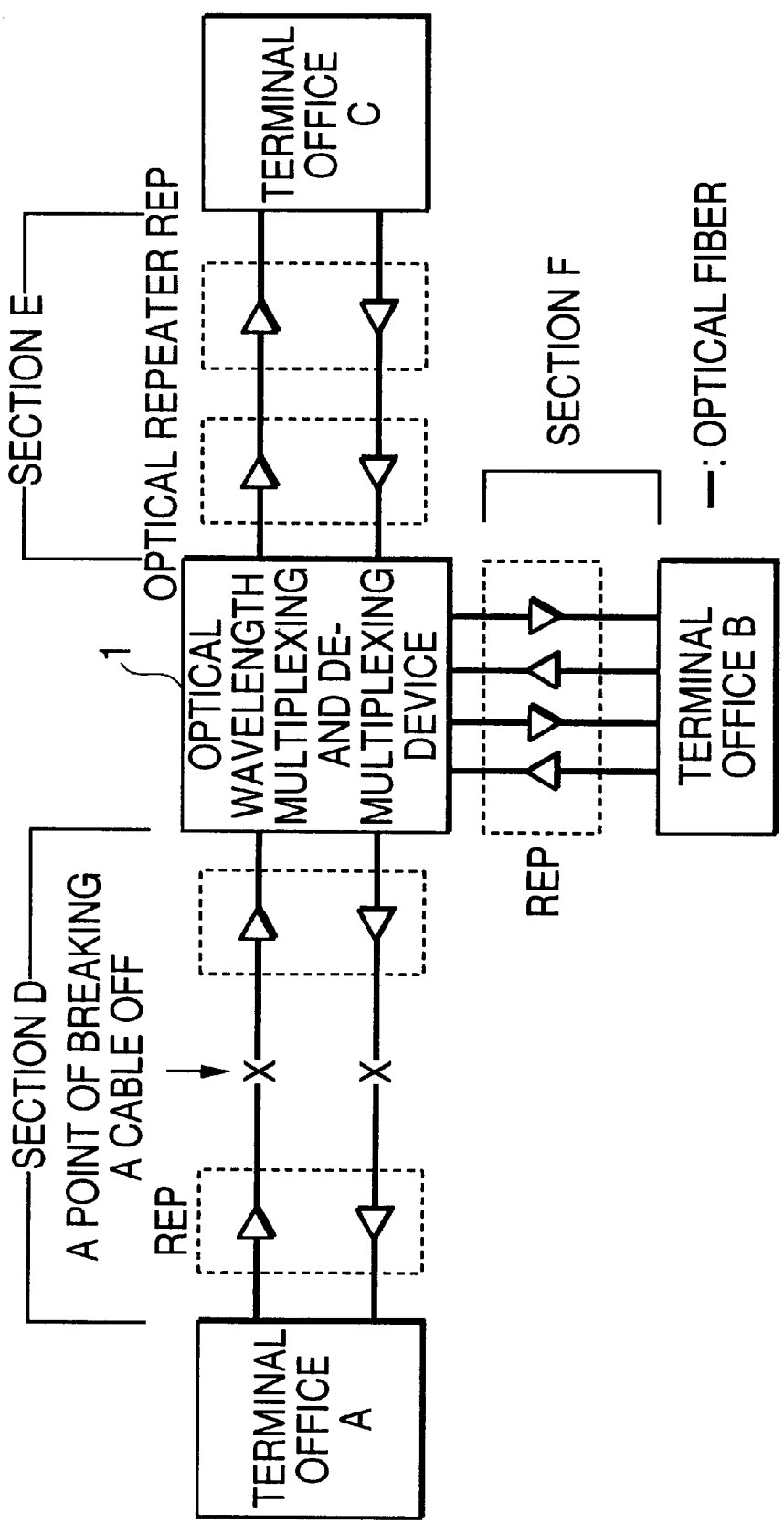
FIG. 11 is a diagram for explaining a problem generated because of losses of some optical signals, which pass through normal sections on breaking a transmission fiber in a certain section off.

FIG. 2 is a structural example of the optical wavelength multiplexing and demultiplexing device 1 of the present invention to obtain the function as shown in FIG. 1. Optical switches 20 to 23 for switching a path are provided at each input and output section of the supposed optical wavelength multiplexing and demultiplexing illustrated in FIG. 10.

Figure 3:
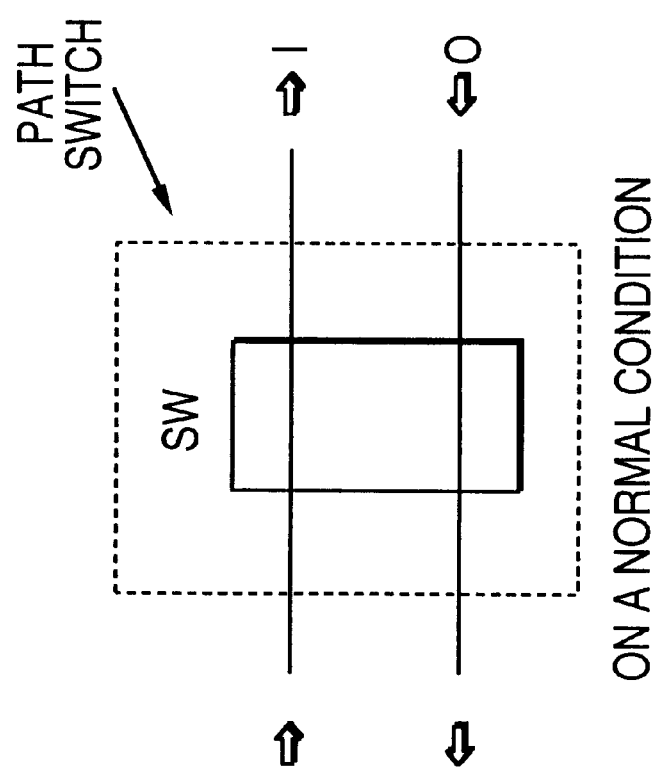
FIGS. 3A and 3B are schematic diagrams of optical switches 20 to 23, which are used as path switches.

FIGS. 3A and 3B show an explanatory diagram of the function of optical switches 20 to 23 used as path switches.

FIG. 3A illustrates a normal condition. In FIG. 3A, an optical signal is inputted to an input port I, and is outputted from an output port O as it is. On the contrary, FIG. 3B illustrates an abnormal condition. In FIG. 3B, an optical signal inputted to an input port I according to a certain condition, is broken off, and a path of the optical signal outputted from an output port O is switched in order to return to the input port I.

Figure 4:
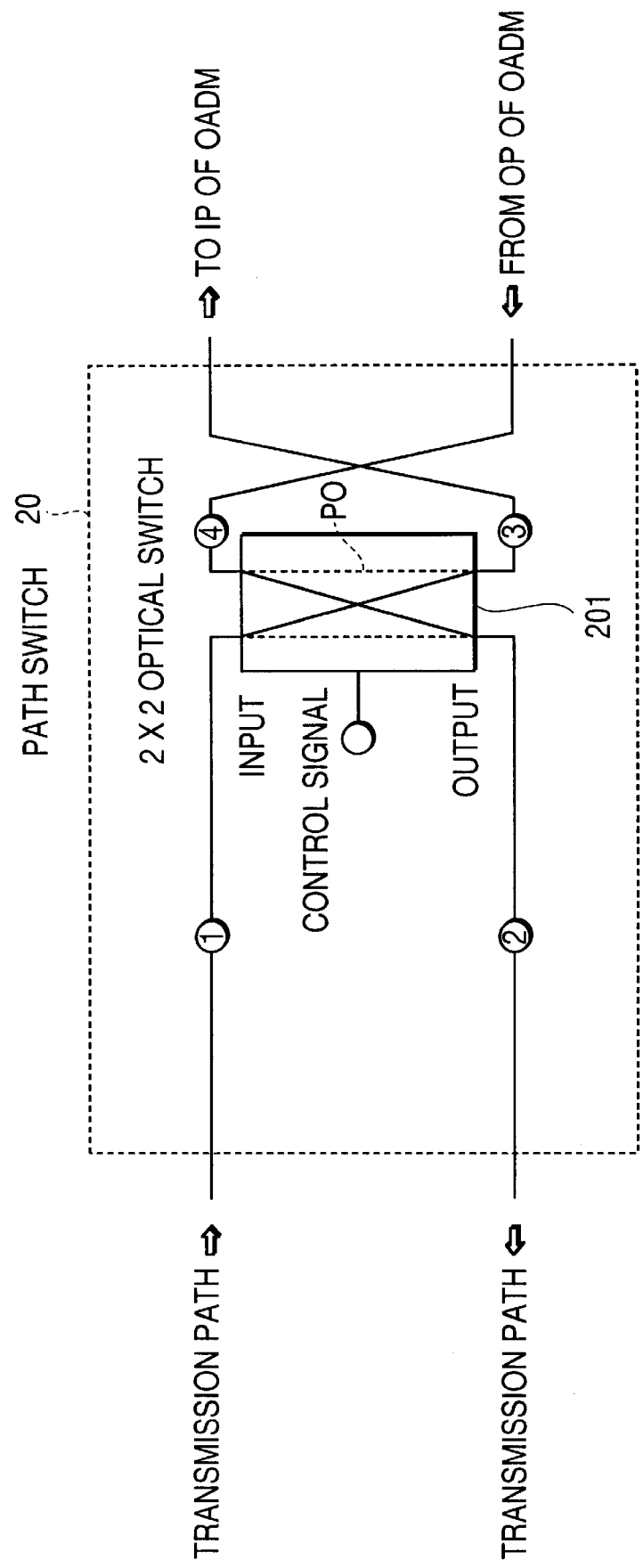
FIG. 4 shows a first embodiment of the path switches 20 to 23 employed in the optical wavelength multiplexing and demultiplexing device 1.

FIG. 4 shows a first embodiment of path switches 20 to 23 employed in the optical wavelength multiplexing and demultiplexing device 1. In FIG. 4, 2×2 optical matrix switch 201 is employed as a path switch.

The 2×2 optical matrix switch 201 has two input ports and two output ports. On a normal condition, the 2×2 optical matrix switch 201 has an input port ① connecting to a transmission path, in which an optical signal is inputted to the optical add-drop multiplexer 2, an output port ② connecting a transmission path, in which an optical signal is outputted from the optical add-drop multiplexer 2, an output port ③ connecting to an input port IP of the optical add-drop multiplexer 2, and an input port ④ connecting an output port OP of the optical add-drop multiplexer 2.

It becomes possible to turn the optical signal from the path of the output port ③ to the input port ④ via a broken line PO by switching with the use of a control signal to the 2×2 optical matrix switch 201.

In this case, the condition becomes the same as that of switching the paths as shown in FIG. 3B.

For example, a 2×2 magnetic optical switch (see the third literature titled as "DC-drift free Ti:LiNbO3 Optical Switch with Low Radiation Loss", pp. 295 of the institute of electronics, information and communication engineers, 1996), a LiNbO3 Mach-Zender Zehnder type optical switch employing electro-optics effect (see the forth literature titled as "2×2 Magnetic Optical Switch", pp. 259, of the institute of electronics, information and communication engineers, 1996), an optical switch employing a semiconductor amplifier (see the fifth literature, titled "High Speed and Low Crosstalk Switching Characteristics of 2×2 Gate Type Optical Switch", pp. 538 of the institute of electronics, information and communication engineers, 1996), or a mechanical optical switch can be used or as a 2×2 optical switch employed in the present invention.

Figure 5:
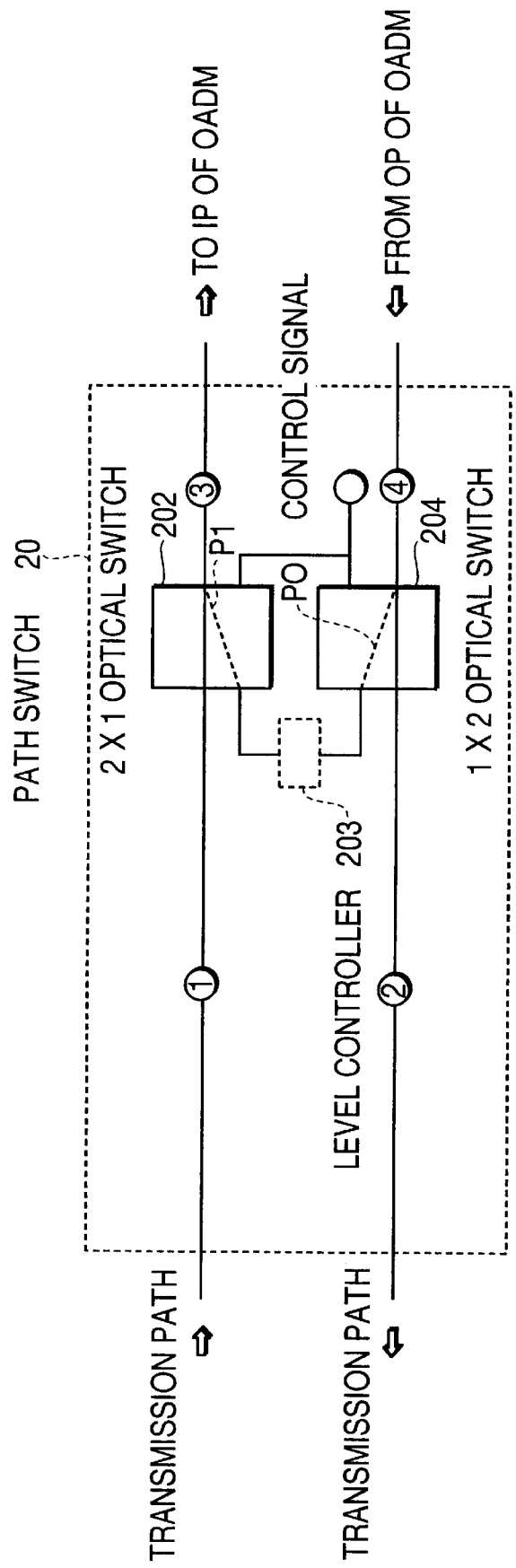
FIG. 5 shows another structural example of the path switches 20 to 23 employed in the optical wavelength multiplexing and demultiplexing device 1.

FIG. 5 illustrates another structural example of path switches 20 to 23 employed in the optical wavelength multiplexing and demultiplexing device. The path switch shown in FIG. 5 is formed of a 2×1 optical switch 202 and a 1×2 optical switch 204.

The 2×1 optical switch 202 includes two input ports and two output ports. Either of two input ports is connected to one output port. The 1×2 optical switch 204 further includes one input port and two output ports. One output port is outputted either of the two output ports.

On a normal situation, each of the optical switches 202 and 204 is controlled by a control signal so as that the input port ① of the 2×1 optical switch 202 is connected to a transmission path, to which a signal is inputted to the optical wavelength multiplexing and demultiplexing device 1, the output port ② of the 1×2 optical switch 204 is connected to a transmission path, from which a signal is outputted, the output port ③ of the 2×1 optical switch 202 is connected to an input port of the optical wavelength multiplexing and demultiplexing device 1, and further, the input port ④ of the 1×2 optical switch 204 is connected to the output port of the optical wavelength multiplexing and demultiplexing device 1.

Additionally, the other output port of the 1×2 optical switch 204 and the other input port of the 2×1 optical switch 202 are connected via a signal level controller 203, such as an optical amplifier or an optical attenuator or the like.

Accordingly, it is possible to switch the 2×1 and 1×2 optical switches 202 and 204 to paths P0 and P1 illustrated with broken lines by a control signal in order to return an optical signal outputted from the output port of the optical wavelength multiplexing and demultiplexing device 1 from the input port ④ of the 1×2 optical switch 204 to the output port ③ of the 2×1 optical switch 202 via the level controller 203. This case will be also the same as that on the condition of switching the path shown in FIG. 3B. Further, in this embodiment, the optical signal is returned via the level controller 203. Therefore, it is easy to correspond the level with the normal level by the use of the controller 203.

For example, a magnetic optical switch, LiNbO3-Mach-Zehnder type switch employing electro-optics effect, an optical switch with the use of the semiconductor amplifier, the mechanical switch or the like can be used as the 2×1 and 1×2 optical switches 202 and 204.

Figure 6:
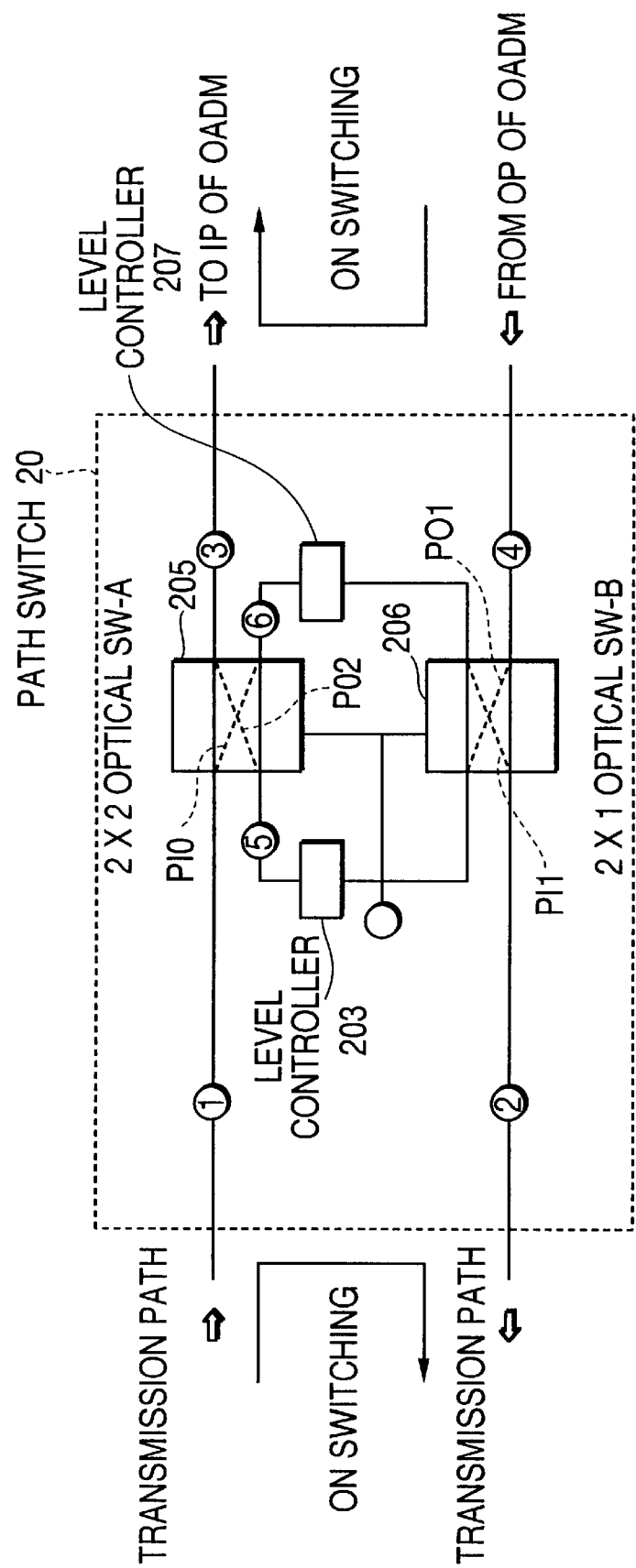
FIG. 6 is a structural example of the other path switches 20 to 23.

FIG. 6 shows still other structural example of the path switches 20 to 23. In this example, two 2×2 optical switches 205 and 206 are included in the structure.

An input port ① of the 2×2 optical switch 205 and an output port ② of the 2×2 optical switch 206 are respectively connected to the transmission path, to which a signal is inputted to the optical wavelength multiplexing and demultiplexing device 1, and the transmission path, from which a signal is outputted. Further, an output port ③ of the 2×2 optical switch 205 and an input port ④ of the 2×2 optical switch 206 are respectively connected to the input port IP and the output port OP of the optical wavelength multiplexing and demultiplexing device 1.

Then, the other output port and the other input port of the 2×2 optical switch 206 are respectively connected to the other input port ⑤ and the other output port ⑥ of the 2×2 optical switch 205 via the level controllers 203 and 207.

With this structure, it is possible to switch a route of a broken line PO1—the level controller 203—a broken line PO2 to a route of a broken line PI0—the level controller 207—a broken line PI1.

In comparison with the structure shown in FIG. 5, it is different point that the path is switched to the signal inputted from the transmission path to transmit to a downward transmission path. It is possible to switch the path to the above-described route of the broken line PI0—the level controller 207—the broken line PI1.

The route is required to check the condition of the system after the broken point of the transmission path is restored.

It is further possible to transmit optical power equivalent to the normal condition, even if the path is switched on abnormal condition or on checking the system, because the level controllers 203 and 207, such as an optical amplifier, an optical attenuator or the like, are provided between the two 2×2 optical switches 205 and 206.

Figure 7:
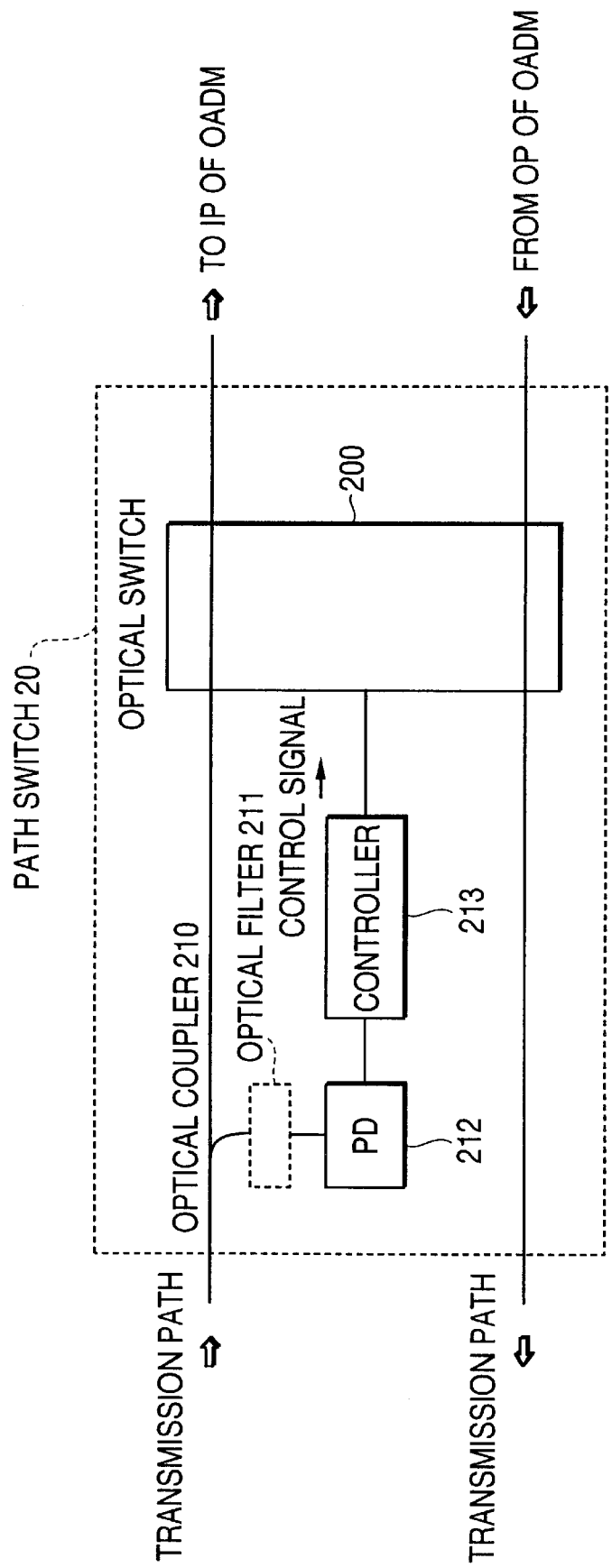
FIG. 7 is an explanatory diagram of generating control signals in each embodiment.
Figure 8:
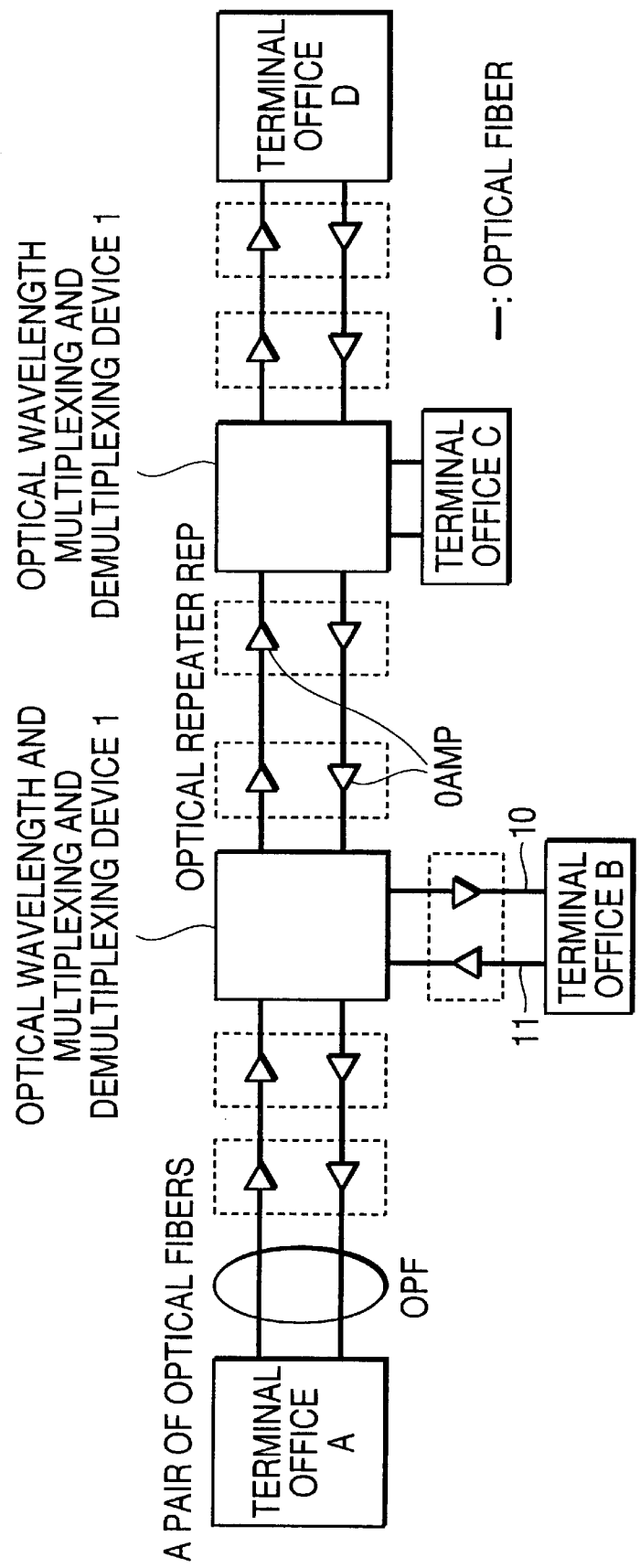
FIG. 8 shows an example of an optical communication system, i.e., a WDM network system, which is produced as a network by the use of the optical wavelength multiplexing and demultiplexing device.
Figure 9:
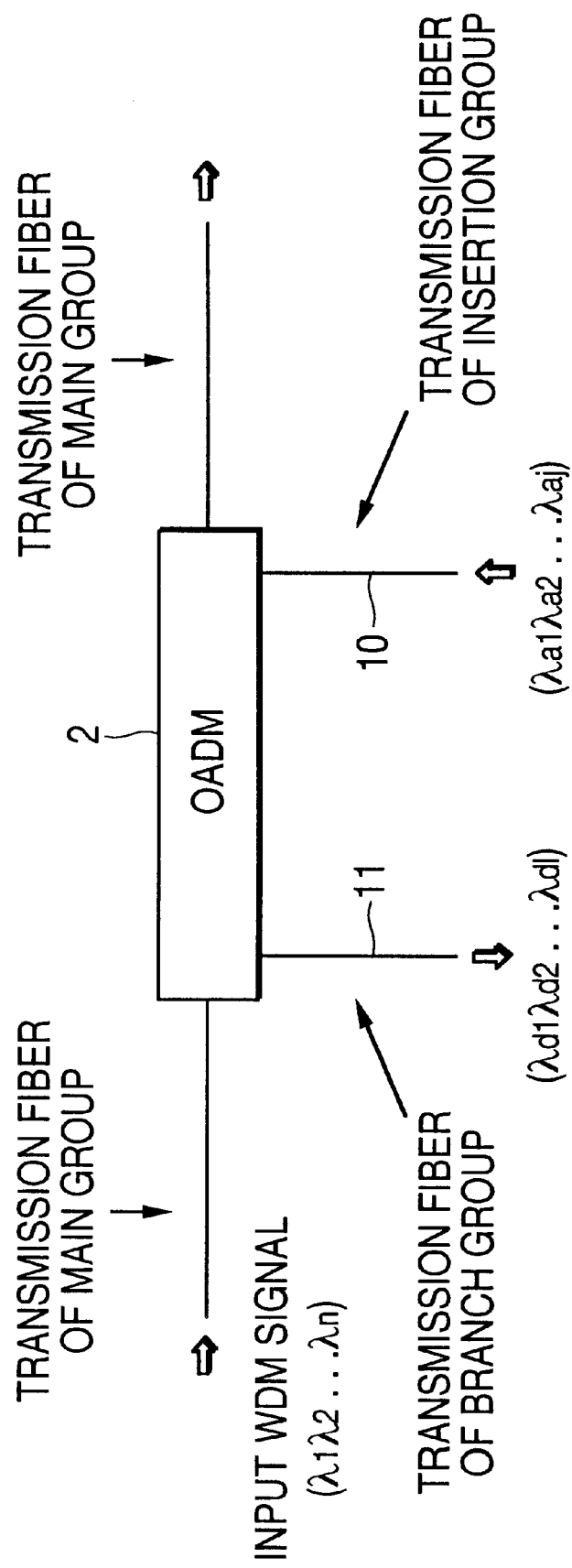
FIG. 9 is a diagram showing a general structure of the optical wavelength multiplexing and demultiplexing device 1 employed in the WDM network.

FIG. 7 is an explanatory diagram of generation of a control signal in the above-described embodiment.

In FIG. 7, reference numeral 200 is an optical switch for switching the path in each embodiment.

A signal, which is inputted to the optical wavelength multiplexing and demultiplexing device 1, is inputted to the path switches 20 to 23. Then, an optical coupler 210 demultiplexes a part of the signal inputted to the optical switch 200. After demultiplexing the signal, the demultiplexed signal is led to a photo diode (PD) 212 via an optical filter 211 to convert to an electrical signal. A controller 213 monitors the converted electrical signal The optical filter 211 arranged between the optical coupler 210 and the photo diode 212 keeps monitor sensitivity well by separating the optical signal to be monitored from an optical signal having different wavelength or ASE noise. A wavelength selective element, such as a dielectric multilayer filter, a fiber grating, a bulk diffraction grating or the like can be used as an optical filter.

Subsequently, the controller 213 monitors and detects the size of the electrical signal, which is converted from the optical signal to determine the existence of the inputted optical signal transmitted from the transmission path. If there is no input signal, the controller 213 generates a control signal to activate the optical switch 200 in order to switch the path as explained above in each embodiment.

An operation principle of switching paths is different according to the type of the optical switch 200.

It is not restrictive to the structure shown in FIG. 7 to generate a control signal for switching the path in the optical wavelength multiplexing and demultiplexing device 1. For example, it is also possible to switch the path by converting a received optical signal modulated by a monitoring control signal to an electrical signal, demodulating the monitoring control signal from the electrical signal and activating the optical switch 200 according to the demodulated monitoring control signal.

Some kinds of methods for transmitting a monitoring control signal from a terminal office to a repeater have been already proposed for practical use in a submarine optical communication system. For example, a method for piling up and modulating a monitoring control signal to a data signal, i.e., a main signal, to be transmitted, or a method for modulating an amplitude of the optical signal having a different wavelength from that of the main signal may be used for transmitting a monitoring control signal.

The optical wavelength multiplexing and demultiplexing device according to the present invention can be also applied to the case where the monitoring control signal is transmitted, even if either of the above-described methods is employed.

As described above in the embodiments, according to the present invention, even if a transmission path in a certain section is broken off in an optical signal transmission system, it becomes possible that a signal level schedule for passing the transmission path in a normal section is not changed, and the transmission quality caused by influence of non-linear effect of the optical fiber is not deteriorated.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore limited to be embraced therein.

What is claimed is:

1. An optical wavelength multiplexing and demultiplexing device comprising:

a plurality of pairs of input and output ports; and a plurality of path switches, each connected to a corresponding pair of the plurality of pairs of input and output ports for breaking off an optical signal inputted to an input port of the corresponding pair, and switching a path of an optical signal output from an output port of the corresponding pair to the input port of the corresponding pair.

2. The optical wavelength multiplexing and demultiplexing device according to claim 1, wherein each of the plurality of path switches includes an optical matrix switch having two input ports and two output ports so that one of the input ports in switchably connectable to either of the two output ports in accordance with a control signal.

3. The optical wavelength multiplexing and demultiplexing device according to claim 1, wherein each of the plurality of path switches includes a first optical matrix switch having two input and one output ports and a second optical matrix switch having one input and two output ports;

a first input port of the first optical matrix switch being connected to a transmission path, to which an optical signal is inputted, a first output port of the second optical matrix switch being connected to a transmission path, from which an optical signal is outputted, the output port of the first optical matrix switch being connected to an input port of an optical add-drop multiplexing circuit, and the input port of the second optical matrix switch being connected to an output port of the optical add-drop multiplexing circuit, and said first and second optical matrix switches are controlled by a control signal to connect the second output port of the second optical matrix switch to the second input port of the first optical matrix switch thereby that an optical transmission path is switched.

4. The optical wavelength multiplexing and demultiplexing device according to claim 3, further comprising a controller provided between the second output port of the second optical matrix switch and the second input port of the first optical matrix switch.

5. The optical wavelength multiplexing and demultiplexing device according to claim 1, wherein each of the plurality of path switches includes first and second optical matrix switches, each having two input ports and two output ports, a first input port of the first optical matrix switch being connected to a transmission path, to which an optical signal is inputted, a first output port of the second optical matrix switch being connected to a transmission path, from which an optical signal is outputted, an input port of an optical add-drop multiplexing circuit being connected to the first output port of the first optical matrix switch, an output port of the optical add-drop multiplexing circuit being connected to the first input port of the second optical matrix switch, and said first and second optical matrix switches are controlled by a control signal to connect the second output port of the second optical matrix switch to the second input port of the first switch, and connect the second output port of the first optical matrix switch to the second input port of the second optical matrix switch.

6. The optical wavelength multiplexing and demultiplexing device according to claim 5, further comprising controllers provided between the second output port of the second optical matrix switch and the second input port of the first matrix optical switch, and between the second output port of the first optical matrix switch and the second input port of the second optical matrix switch.

7. The optical wavelength multiplexing and demultiplexing device according to claim 1, further comprising:

an optical coupler provided in a transmission line, to which optical signals are inputted, for demultiplexing an optical signal inputted from the transmission line;

a photo diode for converting the optical signal demultiplexed by the optical coupler to an electrical signal; and a control circuit for detecting a size of the electrical signal converted by the photo diode, determining existence of an optical signal transmitted from the transmission line according to the size of the detected electrical signal, and generating the control signal, which activates switching of the path switches, when the existence of the input optical signal is not determined.

8. The optical wavelength multiplexing and demultiplexing device according to claim 1, wherein the optical signal is modulated by a monitoring signal, and the optical wavelength multiplexing and demultiplexing device further comprises an optical coupler provided in a transmission line, to which the optical signal is inputted, for demultiplexing an optical signal inputted from the transmission line, a photo diode for converting the optical signal demultiplexed by the optical coupler to an electrical signal, and a controller for demodulating the monitoring signal from the electrical signal converted by the photo diode, activating the optical switch according to the modulated monitoring signal to switch the transmission line.

9. The optical wavelength multiplexing and demultiplexing device according to claim 7, further comprising an optical filter provided between the optical coupler and the photo diode for extracting a wavelength of an optical wavelength component from the optical signal demultiplexed.

10. An optical transmission system comprising:

first, second and third terminal offices; and an optical wavelength multiplexing and demultiplexing device connected via optical amplifiers to the first, second, and third terminal offices for demultiplexing a first specified wavelength of wavelength division multiplexed optical signals transmitted from the first terminal office to transmit to the second terminal office, for multiplexing optical signals having other wavelengths with an optical signal transmitted from the second terminal office to transmit to the third terminal office, and for demultiplexing a second specified wavelength of wavelength division multiplexed optical signals transmitted from the third terminal office to transmit to the second terminal office, for multiplexing optical signals having other wavelengths with an optical signal transmitted from the second terminal office to transmit to the third terminal office, where in optical signals transmitted from the second and third terminal offices to the first terminal office are returned to respectively to the second and third terminal offices, when fault is generated between the first terminal office and the optical wavelength multiplexing and demultiplexing device.

11. The optical transmission system according to claim 10, wherein the optical signals transmitted from the second and third terminal offices to the first terminal office are returned to respectively to the second and third terminal offices by using optical signals from the first terminal office to wavelengths, which are assigned for transmitting the second and third terminal offices.

12. An add/drop multiplexer having first and second states, comprising:

optical add/drop multiplexing circuitry;

a plurality of pairs of input and output ports; and a plurality of switches corresponding, respectively, to the plurality of pairs, wherein when the add/drop multiplexer is in the first state, each switch causes the input and output ports of the corresponding pair to be optically connected to the optical add/drop multiplexing circuitry so that light travels from the input port of the pair, through the optical add/drop multiplexing circuitry, and then to the output port of a different pair, and, when the add/drop multiplexer is in the second state, at least one switch of the plurality of switches causes the input port of the corresponding pair to be optically connected to the output port of the pair so that light travels from the input port to the output port of the pair.

13. An add/drop multiplexer as in claim 12, wherein, in normal operation, the add/drop multiplexer is in the first state so that an optical signal travels through the input port of each respective pair, through the optical add/drop multiplexing circuitry, to the output port of a different pair and then to an optical receiving device, and in abnormal operation, for each of said at least one switch, the signal light is unable to travel from the output port of the different pair to the optical receiving device, so that the add/drop multiplexer is switched to the second state to cause the optical signal to travel through the input port of the corresponding pair and then back out through the output port of the pair.

14. An add/drop multiplexer as in claim 12, wherein the switches are optical matrix switches controllable by a control signal to switch the add/drop multiplexer between the first and second states.

15. An add/drop multiplexer as in claim 13, wherein the switches are optical matrix switches controllable by a control signal to switch the add/drop multiplexer between the first and second states.

16. An add/drop multiplexer as in claim 12, wherein the switches are controllable to cause the add/drop multiplexer to be in the first state during normal operation, and then to be in the second state when abnormal operation is detected.

17. An add/drop multiplexer as in claim 13, wherein the switches are controllable to cause the add/drop multiplexer to be in the first state during normal operation, and then to be in the second state when abnormal operation is detected.

18. An add/drop multiplexer as in claim 12, wherein each switch comprises a first optical matrix switch having two input and one output ports, and a second optical matrix switch having one input and two output ports, the first and second optical matrix switches being controllable so that when the add/drop multiplexer is in the first state, a first input port of the first optical matrix switch is connected to the input port of the corresponding pair, a first output port of the second optical matrix switch is connected to the output port of the corresponding pair, the output port of the first optical matrix switch is connected to the optical add/drop multiplexing circuitry, and the input port of the second optical matrix switch is connected to the optical add/drop multiplexing circuitry, and when the optical add/drop multiplexer is in the second state, the second output port of the second optical matrix switch is connected to the second input port of the first optical matrix switch.

19. An add/drop multiplexer as in claim 18, further comprising a level controller between the second output port of the second optical matrix switch and the second input port of the first optical matrix switch.

20. An optical add/drop multiplexer as in claim 12, wherein each switch comprises first and second optical matrix switches, each having two input ports and two output ports, the first and second optical matrix switches being controllable so that, when the add/drop multiplexer is in the first state,
a first input port of the first optical matrix switch is connected to the input port of the corresponding pair;
a first output port of the second optical matrix switch is connected to the output port of the corresponding pair,
the optical add/drop multiplexing circuitry is connected to the first output port of the first optical matrix switch, and
the optical add/drop multiplexing circuitry is connected to the first input port of the second optical matrix switch, and when the add/drop multiplexer is in the second state,
the second output port of the second optical matrix switch is connected to the second input port of the first switch, and
the second output port of the first optical matrix switch is connected to the second input port of the second optical matrix switch.

21. An add/drop multiplexer comprising:

optical add/drop multiplexing circuitry;

a plurality of pairs of input and output ports; and a plurality of switches corresponding, respectively, to the plurality of pairs, wherein
when the add/drop multiplexer is in normal operation, each switch causes the input and output ports of the corresponding pair to be optically connected to the optical add/drop multiplexing circuitry so that light travels from the input port of the pair, through the optical add/drop multiplexing circuitry, and then through the output port of a different pair to an optical receiving device, and, when the add/drop multiplexer is in abnormal operation, for at least one switch, the signal light is unable to travel from the output port of the different pair to the optical receiving device, so that said at least one switch is controlled to cause the optical signal to travel through the input port of the corresponding pair and then back out through the output port of the pair.

22. An optical transmission system comprising:

first and second terminals; and an optical add/drop multiplexer connected to the first and second terminals, the optical add/drop multiplexer having first and second states so that,
in the first state, the optical add/drop multiplexer receives an optical signal from the second terminal, multiplexes the received optical signal with other optical signals, and provides the multiplexed optical signals to the first terminal, and
in the second state, the optical add/drop multiplexer causes the optical signal received from the second terminal to be transmitted back to the second terminal.

23. An optical transmission system as in claim 22, wherein the first state corresponds to normal operation where the multiplexed optical signals are able to travel to the first terminal, and the second state corresponds to abnormal operation where the multiplexed optical signals are not able to travel to the first terminal due to problems with a transmission path between the first terminal and the optical add/drop multiplexer.

* * * * *

UNITED STATES PATENT AND TRADEMARK OFFICE
CERTIFICATE OF CORRECTION

PATENT : 6,061,157
DATED : May 9, 2000
INVENTOR(S) : Takafumi TERAHARA

It is certified that error appears in the above-identified patent and that said Letters Patent is hereby corrected as shown below:

Col. 9, line 52, change "where in" to --wherein--.

Signed and Sealed this

Twentieth Day of March, 2001

Attest:

NICHOLAS P. GODICI

*Attesting Officer*     *Acting Director of the United States Patent and Trademark Office*